(12) United States Patent
Gretz

(10) Patent No.: US 8,563,876 B1
(45) Date of Patent: Oct. 22, 2013

(54) CABLE HOLDING OUTLET BOX

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 394 days.

(21) Appl. No.: 12/660,745

(22) Filed: Mar. 3, 2010

(51) Int. Cl.
  *H01R 13/502* (2006.01)
  *H05K 7/02* (2006.01)
  *H02G 3/18* (2006.01)
  *H05K 5/00* (2006.01)

(52) U.S. Cl.
  USPC ........... 174/559; 174/541; 174/653; 174/655; 361/730

(58) Field of Classification Search
  USPC ............... 174/50, 559, 480, 66, 67, 541, 653, 174/655; 312/223.1, 223.2, 223.3, 223.6; 361/600, 724, 730, 752
  See application file for complete search history.

(56) References Cited

U.S. PATENT DOCUMENTS

| | | | |
|---|---|---|---|
| 4,900,068 A * | 2/1990 | Law | 285/139.2 |
| 5,410,104 A * | 4/1995 | Gretz et al. | 174/653 |
| D495,301 S | 8/2004 | Newell | |
| D502,386 S | 3/2005 | Provenzano et al. | |
| 6,932,624 B1 | 8/2005 | Hoopes et al. | |
| D554,475 S | 11/2007 | Gorin et al. | |
| 7,304,236 B1 * | 12/2007 | Gretz et al. | 174/58 |
| D568,719 S | 5/2008 | Gorin et al. | |
| 7,390,964 B2 | 6/2008 | Gorin et al. | |
| 7,435,900 B1 * | 10/2008 | Gretz | 174/50 |
| 7,485,805 B1 * | 2/2009 | Gretz | 174/50 |
| 7,525,043 B1 | 4/2009 | Gretz | |
| 7,667,145 B2 * | 2/2010 | Dinh et al. | 174/480 |
| 7,826,202 B2 * | 11/2010 | Johnson et al. | 361/641 |
| 2010/0195288 A1 * | 8/2010 | Byrne | 361/724 |

* cited by examiner

*Primary Examiner* — Hoa C Nguyen
*Assistant Examiner* — Binh Tran

(57) ABSTRACT

An electrical box assembly that is supplied with electricity by an external electrical cord and which in turn supplies electricity to a nearby wall-mounted outlet box. The electrical box assembly includes a cord grip mount that accepts a cord grip fitting for securing the electrical cord to the assembly and sealing around the connected electrical cord. The electrical box assembly may include connecting points for a low voltage scoop to provide a passageway for routing coax cable to the nearby outlet box. The electrical box assembly is especially useful for supplying electrical power to a wall-mounted TV while minimizing disruption of adjacent wall surfaces and underlying studs.

14 Claims, 15 Drawing Sheets

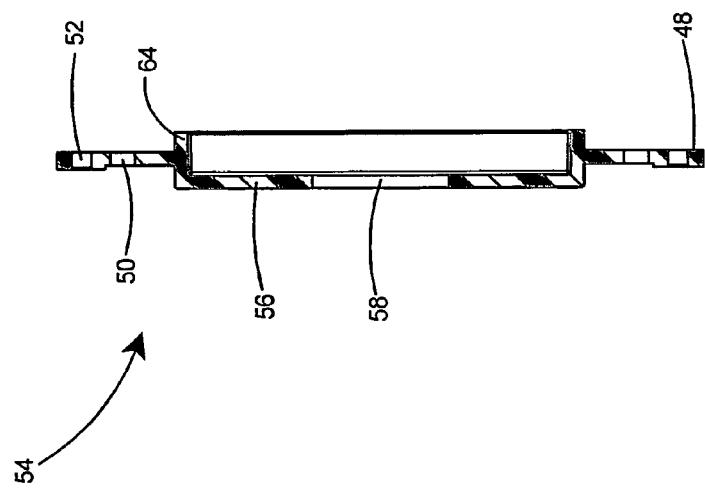
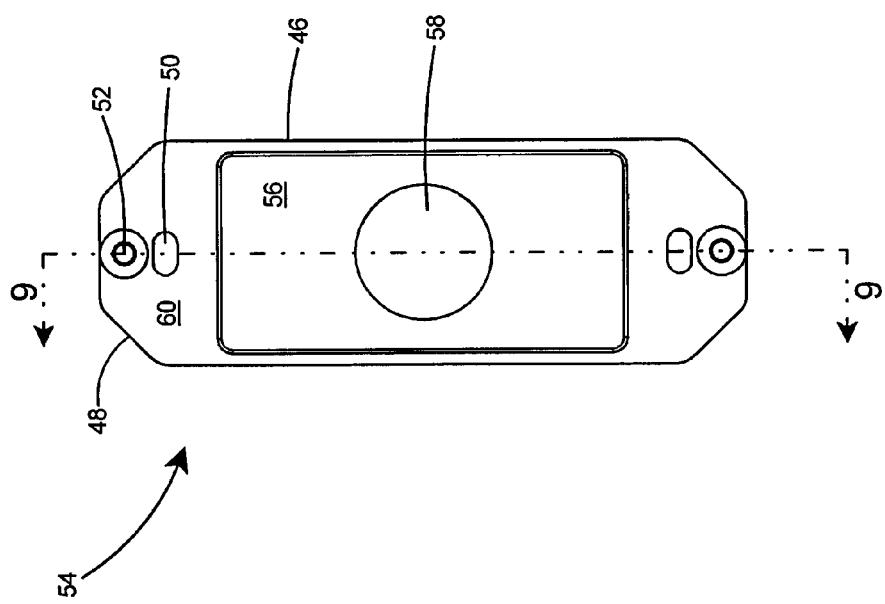
Fig. 9
Fig. 8

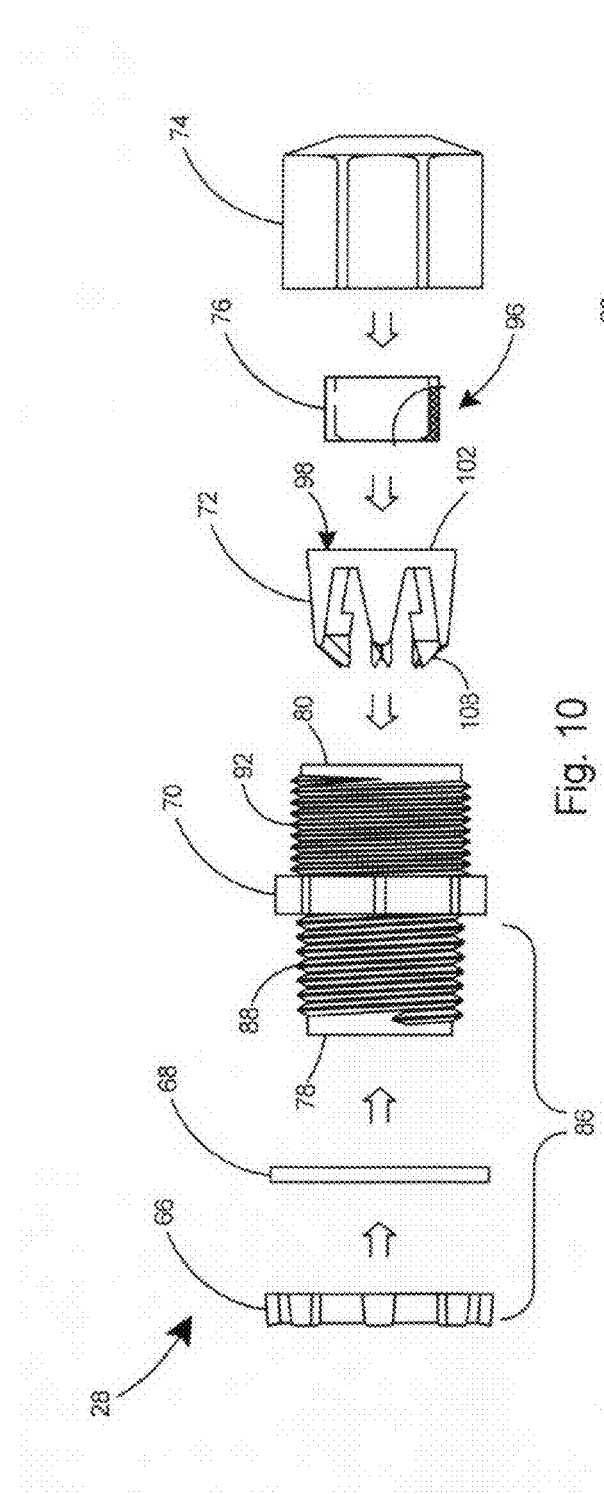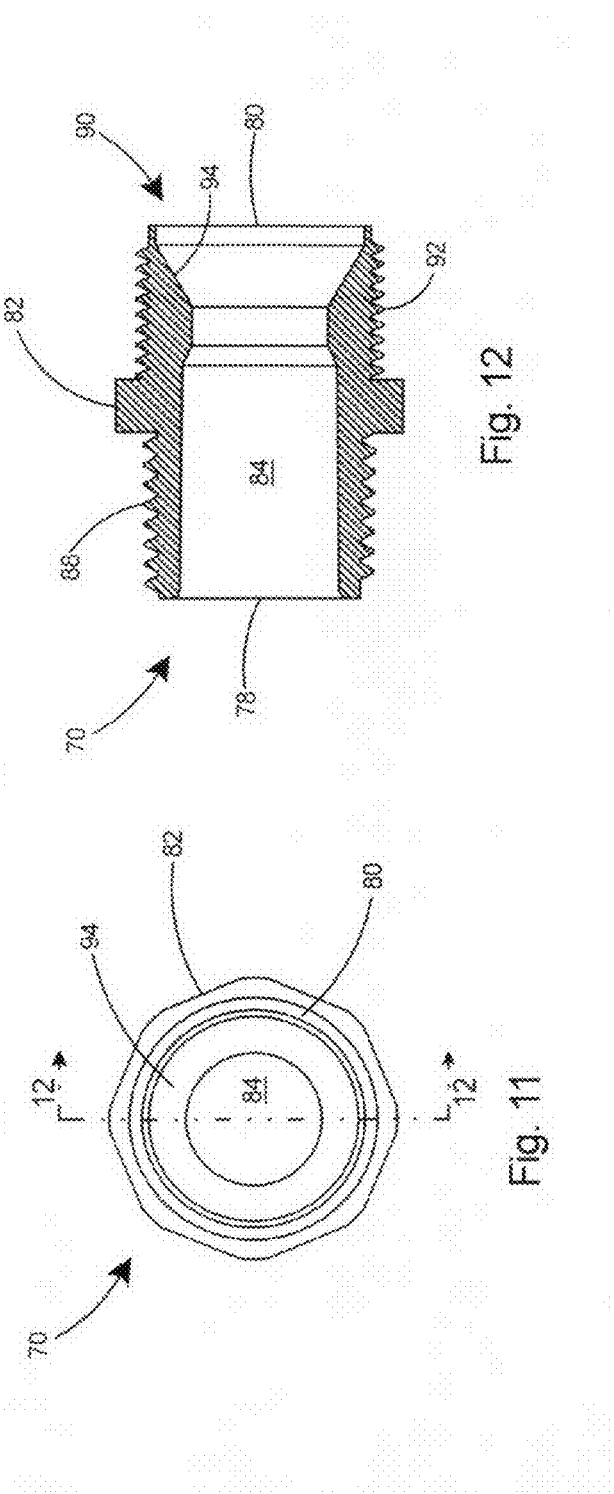

CABLE HOLDING OUTLET BOX

FIELD OF THE INVENTION

This invention relates to the installation of electrical components and specifically to an electrical box assembly that eliminates the need to disturb wall studs in order to provide electrical access to a portion of the wall previously without electrical outlets.

BACKGROUND OF THE INVENTION

With the advent of lightweight large screen televisions, such as those with LCD and plasma displays, it has become common for homeowners to mount lightweight TVs to the wall to free up floor space and thereby eliminate the need for a stand to obtain the optimum viewing height.

Aesthetically, when mounting a TV on a wall, it is desirable to keep the electrical cables out of sight. Thus, even if an existing outlet is available directly under the newly installed TV, it is preferable to route electrical cables within the wall to keep them out of sight. Providing an electrical outlet for the TV by conventional means typically requires locating the closest existing electrical box, installing a new outlet box at the location of the TV, pulling electrical cable between the boxes, and completing the wiring connections to provide line voltage to the new electrical box.

Many times the existing electrical outlets are located at some distance horizontally from the desired location of the TV, making it necessary to remove a portion of the drywall, drill holes in the underlying studs, and pull electrical cable through the studs. This is a very time consuming task as the wallboard is disrupted and must be replaced and the wall must be plastered and repainted or re-wallpapered to restore the wall to its original condition.

What is needed therefore is a device and method for installing an electrical outlet on a wall that causes no disruption to the visible wall surface below a wall-mounted TV, does not require alteration of the underlying studs, eliminates the pulling of electrical cables through adjacent studs in the wall, and eliminates extensive repairs to the wall surface after the cables are installed. When installed, such a device should provide a clean wall underneath the wall-mounted TV, with no cables running up the wall from a lower electrical outlet to the TV.

SUMMARY OF THE INVENTION

The invention is an electrical box assembly that is supplied with electricity by an external electrical cord and which in turn supplies electricity to a nearby wall-mounted outlet box. The electrical box assembly includes a cord grip mount that accepts a cord grip fitting for securing the electrical cord to the assembly and sealing around the connected electrical cord. The electrical box assembly may include connecting points for a low voltage scoop to provide a passageway for routing coax cable to the nearby outlet box. The electrical box assembly is especially useful for supplying electrical power to a wall-mounted TV while minimizing disruption of adjacent wall surfaces and underlying studs.

OBJECTS AND ADVANTAGES

Several advantages are achieved with the electrical box assembly of the present invention, including:

(1) The electrical box assembly eliminates the disruption of adjacent wall surfaces for the purpose of routing electrical cables through the wall.
(2) The electrical box assembly eliminates the need to alter underlying studs in order to supply electricity to a wall-mounted TV.
(3) The electrical box assembly eliminates the pulling of electrical cables through adjacent studs in the wall.
(4) The electrical box assembly eliminates the need to make extensive repairs to surrounding wall surfaces.
(5) The electrical box assembly provides a clean wall, free of visible cables; underneath any wall-mounted TV it is used in conjunction with.

These and other objects and advantages of the present invention will be better understood by reading the following description along with reference to the drawings.

DESCRIPTION OF THE DRAWINGS

FIG. 8 is a front elevation view of the cord grip mount depicted in FIG. 6.

FIG. 9 is a sectional view of the cord grip mount taken along line 9-9 of FIG. 8.

FIG. 10 is an exploded perspective view of a cord grip fitting forms a portion of the electrical box assembly of FIG. 1.

FIG. 11 is an end view of a cord grip body that forms a portion of the cord grip fitting depicted in FIG. 10.

FIG. 12 is a sectional view of the cord grip fitting taken along line 12-12 of FIG. 11.

Figure 1:
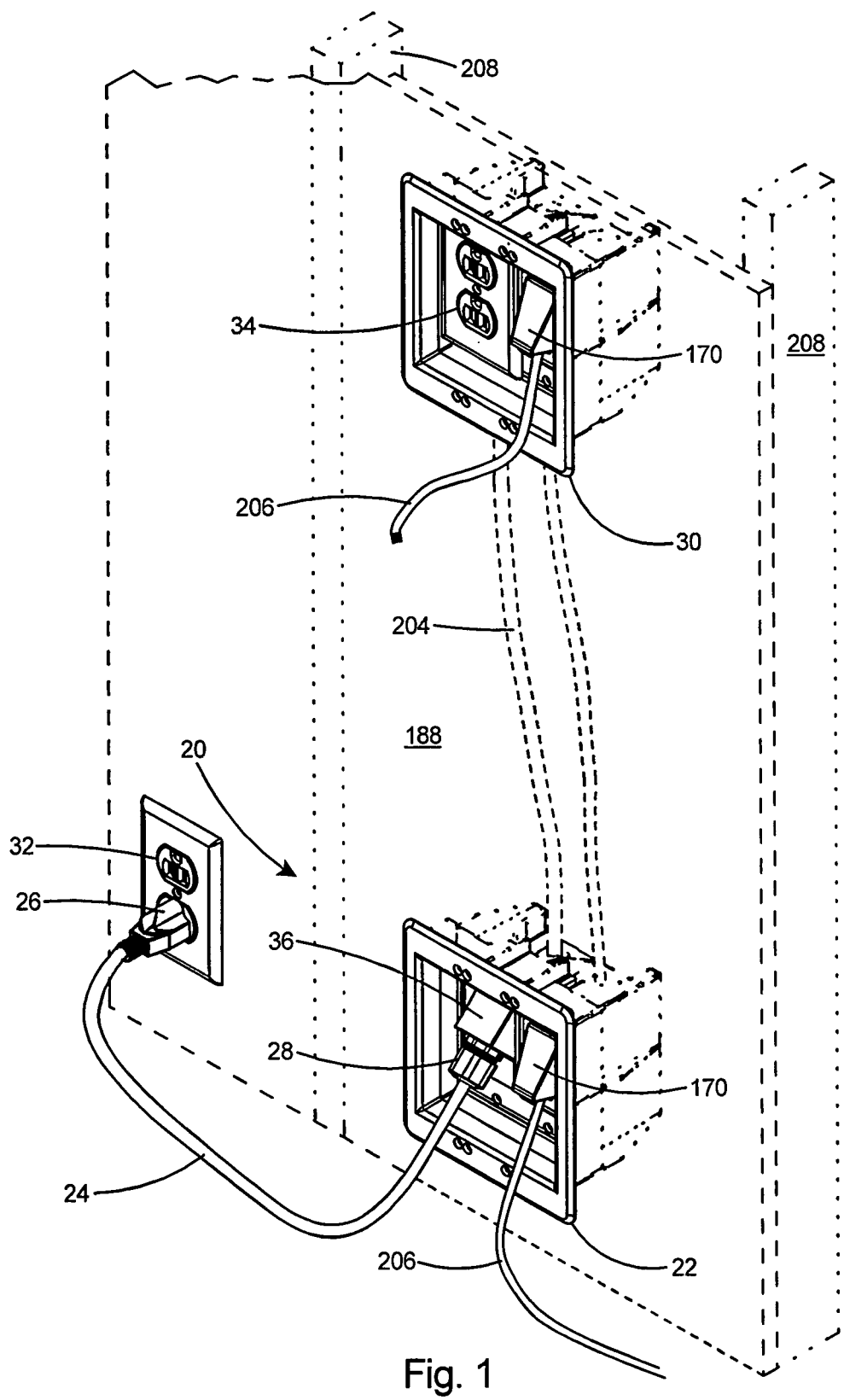
FIG. 1 is a perspective view of the preferred embodiment of an electrical box assembly according to the present invention depicted in a practical application installed on a wall and supplying electricity to a second electrical box assembly.
Figure 2:
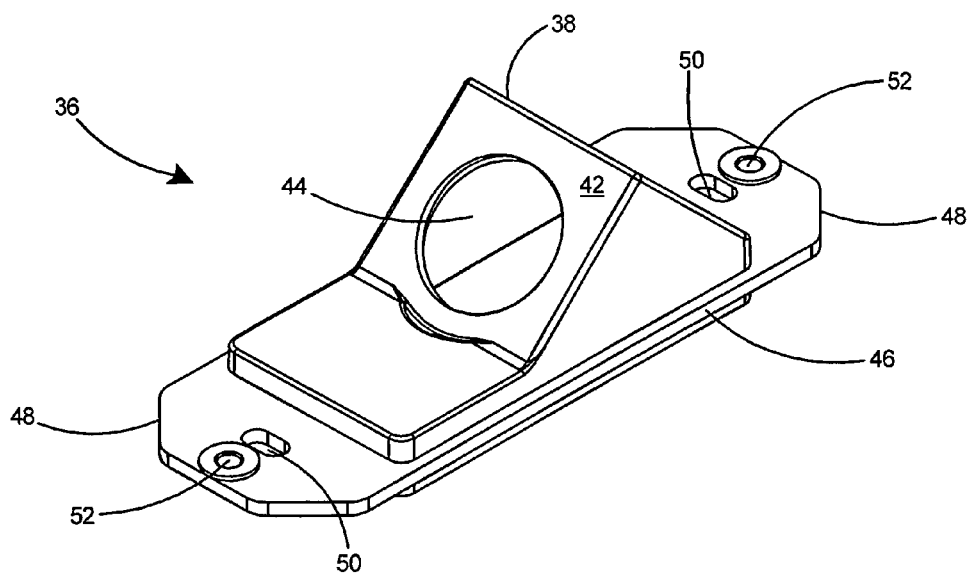
FIG. 2 is a front perspective view of a first and preferred embodiment of a cord grip mount that forms a portion of the electrical box assembly of FIG. 1.
Figure 3:
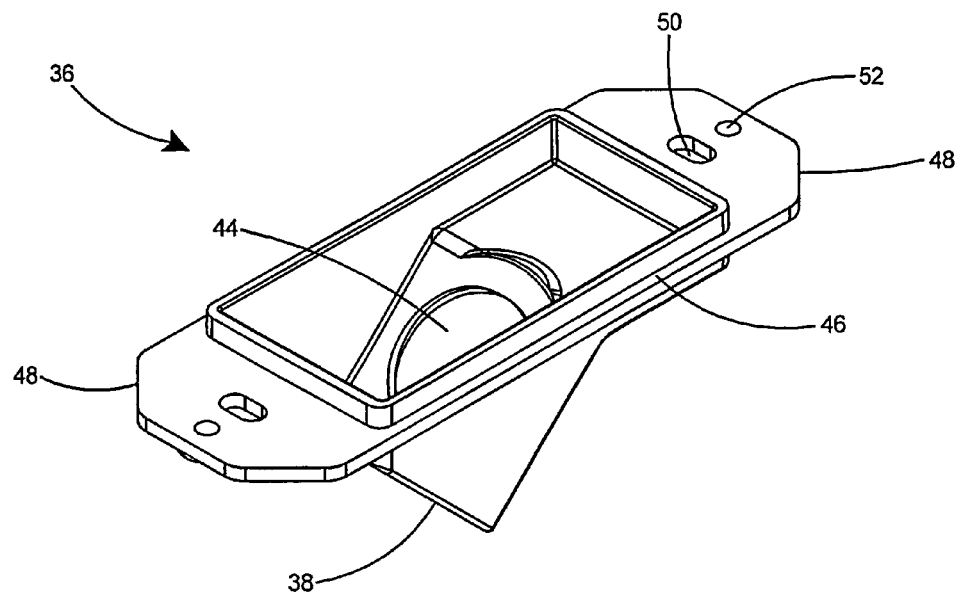
FIG. 3 is a rear perspective view of the cord grip mount depicted in FIG. 2.
Figure 5:
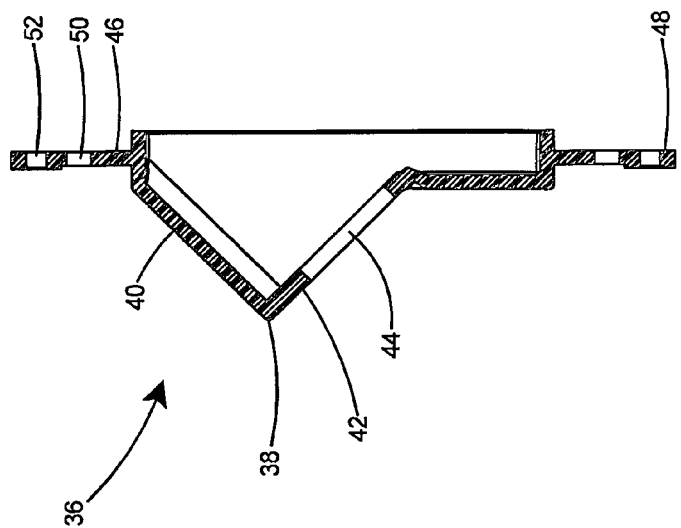
FIG. 5 is a sectional view of the cord grip mount taken along line 5-5 of FIG. 4.
Figure 4:
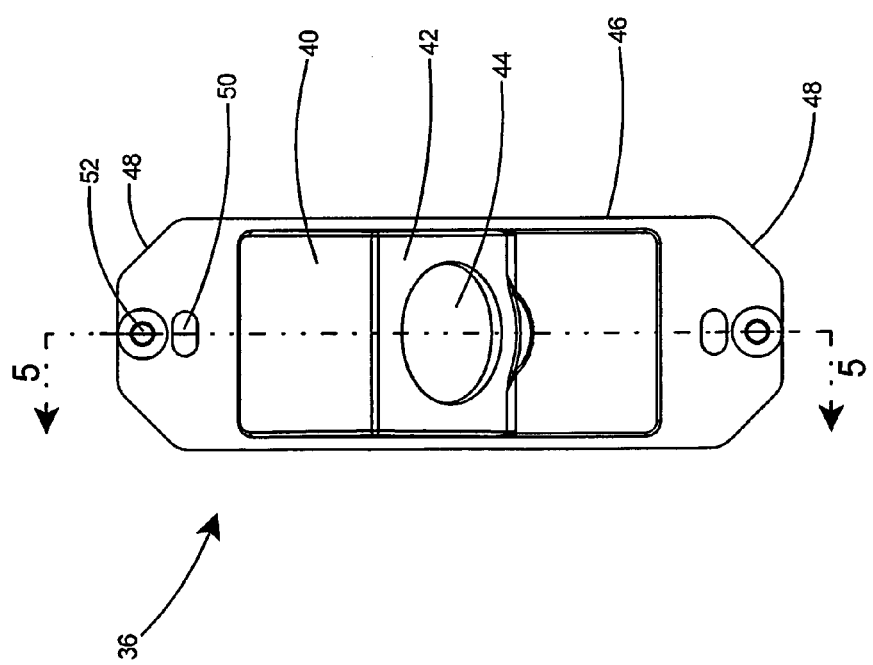
FIG. 4 is a front elevation view of the cord grip mount depicted in FIG. 2.
Figure 6:
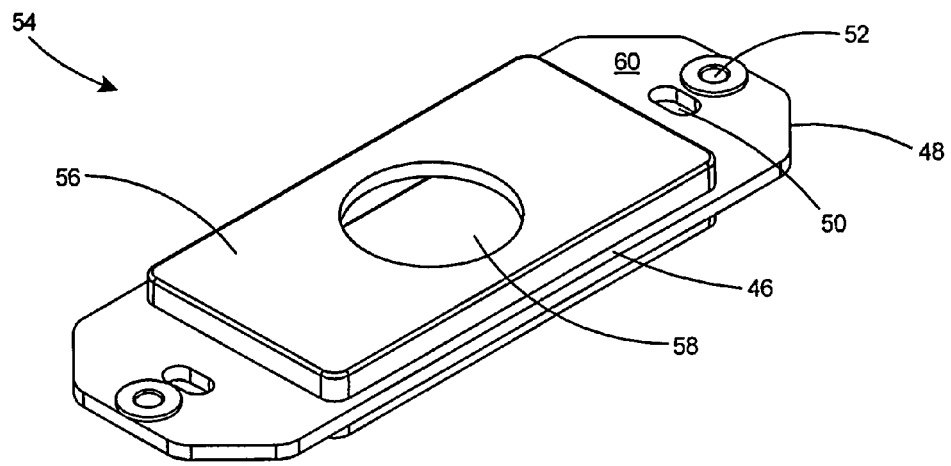
FIG. 6 is a front perspective view of a second embodiment of a cord grip mount according to the present invention.
Figure 7:
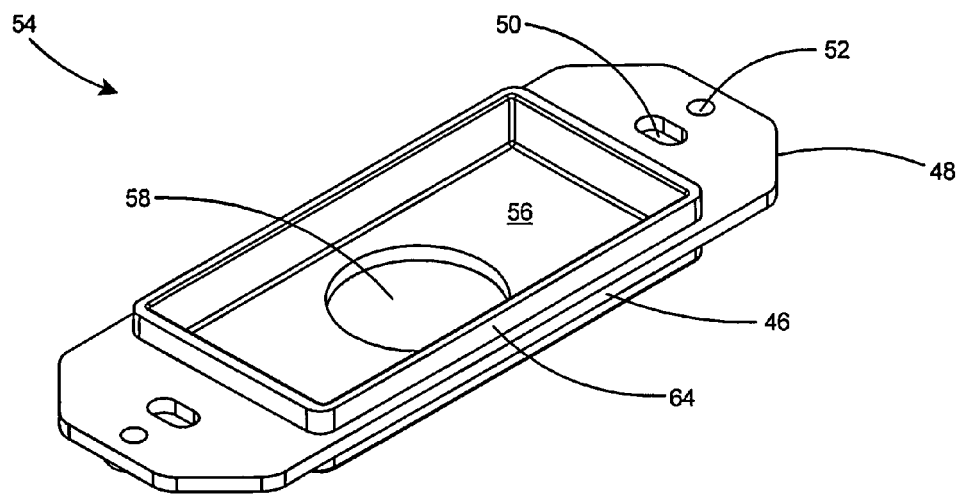
FIG. 7 is a rear perspective view of the cord grip mount depicted in FIG. 6.

INDEX TO REFERENCE NUMERALS IN DRAWINGS 20 cable holding electrical box assembly
22 electrical box
24 electrical cord
26 plug end of electrical cord
27 free end of electrical cord
28 cord grip fitting
30 outlet box
32 existing duplex outlet
34 electrical outlet
36 cord grip mount, preferred embodiment
38 outward extending nose portion
40 upper surface of nose portion
42 lower surface of nose portion
44 circular opening
46 base portion
48 end portion
50 inner aperture
52 threaded bores
54 cord grip mount, second embodiment
56 flap panel
58 circular opening
60 front side of base portion
62 back side of base portion
64 peripheral wall
66 locknut
68 sealing ring
70 cord grip body
72 gripper ring
74 compression nut
76 grommet
78 first end of cord grip body
80 second end of cord grip body
82 central flange
84 internal bore
86 mount fastening arrangement
88 external threads on cord grip mount
90 cord fastening arrangement
92 external screw threads on cord grip body
94 conical seat
96 waterproof sealing arrangement
98 cavity in gripper ring
100 circular periphery of gripper ring
102 first end of gripper ring
104 second end of gripper ring
106 internal bore
108 finger
110 hex-shaped outer periphery of compression nut
112 central bore
114 internal screw threads
116 box member
118 trim plate
120 divider plate
122 side wall
124 back wall
125 inner cavity
126 front edge
127 rail
128 channel
130 flange
132 aperture in flange
134 fastener
136 tab
138 first mounting arrangement
140 second mounting arrangement
142 rotatable flag
144 mounting fastener
146 aperture
148 head
150 oversize aperture
152 sidewall flange
154 boss
156 mounting screw
158 recessed area
160 connection point
162 flange of trim plate
164 peripheral wall
166 collar
167 recessed wall portion
168 knockout area
170 low voltage scoop
172 base portion
174 ear
176 aperture
178 threaded bore
180 outer wall
182 sidewall
184 conduit or passageway for cable
186 perimeter wall
188 wall
190 quick connect electrical fitting
192 cover plate
194 electrical conductor
196 electrical enclosure
198 fastener for cord grip mount
200 fastener for scoop
202 fastener for cover plate
204 electrical cable
206 coax cable
208 stud

DETAILED DESCRIPTION OF THE INVENTION

Referring to FIG. 1 there is shown a preferred embodiment of a cable holding electrical box assembly 20 according to the present invention. The cable holding electrical box assembly 20 includes an electrical box 22, an electrical cord 24 with a plug end 26, a free end 27 (see FIG. 28), and a cord grip fitting 28 for securing the electrical cord 24 to the assembly 20. The cable holding electrical box assembly 20 of the present invention enables a homeowner to provide electrical outlets on a wall for powering a TV or similar electrical component that will later be mounted to the wall over the electrical outlets. Power to the outlet box 30 for the TV, which in the practical application shown in FIG. 1 is a second cable holding electrical box, is supplied by the electrical cord 24 which is plugged into an existing duplex outlet 32. The cable holding electrical box assembly 20 enables a homeowner to quickly and easily provide electrical outlets 34 for a TV or similar component at the point where the component will be mounted and in a manner that no electrical cables will be in view. The cable holding electrical box assembly 20 therefore eliminates a significant amount of repair work for the homeowner as compared to the conventional means of powering an electrical box, such as removing drywall, routing electrical cables within the wall and through existing studs as required. The electrical box assembly 20 includes a cord grip mount 36 that is used to attach the cord grip fitting 28 to the electrical box 22. The electrical box 22 is a two-gang box that can be configured by the homeowner to accept two low voltage components, two high voltage components, or one high and one low voltage component.

With reference to FIGS. 2-5, the preferred embodiment of the cord grip mount 36 includes an outward extending nose portion 38 with an upper surface 40 and a lower surface 42 and a circular opening 44 in the lower surface 42. The cord grip mount 36 further includes a substantially planar base portion 46 with end portions 48 having inner apertures 50 and threaded bores 52 therein.

Referring to FIGS. 6-9, a second embodiment of the cord grip mount 54 includes a flat panel 56 instead of an outward extending nose portion. The flat panel 56 includes a circular opening 58 therein. The second embodiment of the cord grip mount 54, similar to the preferred embodiment, includes the substantially planar base portion 46, end portions 48, and inner apertures 50 and threaded bores 52 in the end portions 48. The flat panel 56 of the cord grip mount 54 is raised above the front side 60 and recessed away from the back side 62 of the base portion 46. A peripheral wall 64 extends around the panel 56 on the back side 62.

Figure 16:
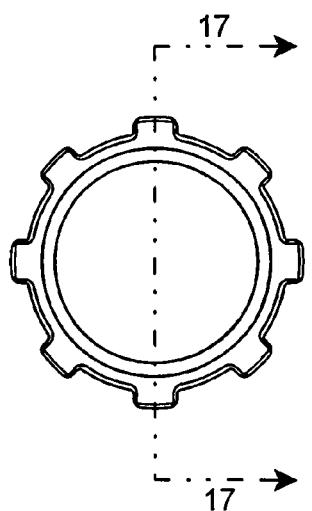
FIG. 16 is a plan view of a cord locknut that forms a portion of the cord grip fitting depicted in FIG. 10.
Figure 17:
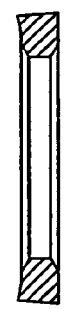
FIG. 17 is a sectional view of the locknut taken along line 17-17 of FIG. 16.
Figure 20:
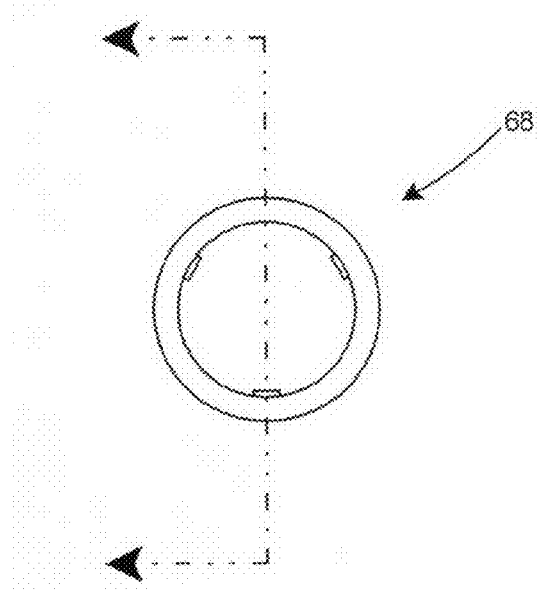
FIG. 20 is a plan view of a sealing ring that forms a portion of the cord grip fitting depicted in FIG. 10.
Figure 21:
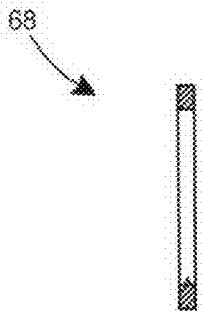
FIG. 21 is a sectional view of the sealing ring taken along line 21-21 of FIG. 20.

With reference to FIG. 10, the cord grip fitting 28 includes, from left to right in the figure, a locknut 66, a sealing ring 68, cord grip body 70, gripper ring 72, and a compression nut 74. A grommet 76, a lower portion of which is cut away in the figure, may be included in the cord grip fitting 28 as an option if required in a wet environment. As shown in FIGS. 11-12, the tubular cord grip body 70 includes a first end 78, a second end 80, a central flange 82, and an internal bore 84 there through. The cord grip fitting 28 includes a mount fastening arrangement 86 for securing the cord grip fitting to the cord grip mount 36 (see FIG. 2). The mount fastening arrangement 86 for securing the cord grip fitting 28 to the cord grip mount 36 includes external threads 88 on the first end 78 of the cord grip body 70, the sealing ring 68, and the internally threaded locknut 66 for urging the sealing ring 68 against the central flange 82 of the cord grip body 70. A detailed view of the locknut 66 is shown in FIGS. 16-17 and a detailed view of the sealing ring 68 is shown in FIGS. 20-21. The cord grip fitting 28 further includes a cord fastening arrangement 90 for securing an electrical cord (not shown) to the second end 80 of the fitting 28. As shown in FIG. 12, the cord fastening arrangement 90 includes external screw threads 92 and a conical seat 94 coaxial with the internal bore 84 on the second end 80 of the cord grip body 70. The cord fastening arrangement 90 includes an optional waterproof sealing arrangement 96 for sealing the cord grip fitting 28 in a watertight seal against the electrical cord. Tightening the compression nut 74 on threads 92 of cord grip body 70 compresses fingers 108 of gripper ring 72 against the grommet 76 and seals the resilient grommet 76 against the electrical cord (not shown). The material of construction of the cord grip body 70, gripper ring 72, and compression nut 74 is preferably nylon. The material of construction of the sealing ring 68 is preferably polyethylene and the grommet 76 is preferably constructed of SANTO-PRENE® thermoplastic rubber available from Advanced Elastomer Systems of Akron, Ohio.

Figure 13:
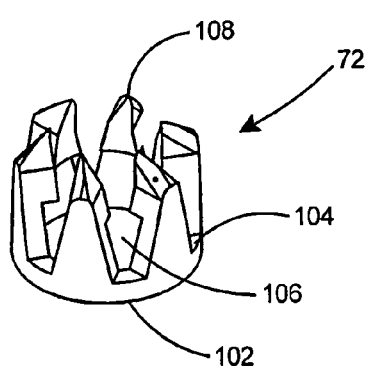
FIG. 13 is a perspective view of a gripper ring that forms a portion of the cord grip fitting depicted in FIG. 10.
Figure 14:
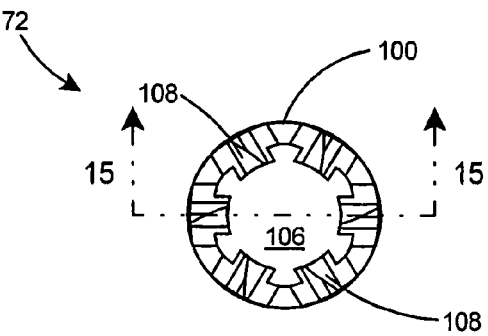
FIG. 14 is a plan view of the gripper ring of FIG. 13.
Figure 15:
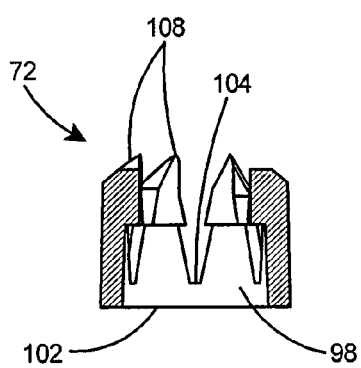
FIG. 15 is a sectional view of the gripper ring taken along line 15-15 of FIG. 14.

As shown in FIGS. 13-15, the one-piece gripper ring 72 is constructed of resilient material and includes a cavity 98 therein, a circular periphery 100, a first end 102, a second end 104, an internal bore 106, and a plurality of fingers 108 extending from the periphery of the first end 102. As shown in FIG. 10, tightening of the compression nut 74 on the cord grip body 70 compresses the gripper ring 72 within the conical seat 94 of the cord grip body 70 and thereby causes the fingers 108 to close against and firmly grip an inserted electrical cord (not shown). In case a waterproof seal is required around the cord, a resilient grommet 76 is inserted into the cavity 98 of the gripper ring 72. The waterproof sealing arrangement 96 includes the cavity 98 in the first end 102 of the gripper ring 72 and the resilient grommet 76 seated within the cavity 98. Tightening of the compression nut 74 on the cord grip body 70 compresses the gripper ring 72 within the conical seat 94 of the cord grip body 70 and causes the fingers 108 of the gripper ring 72 to compress the resilient grommet 76 against the electrical cord, thereby creating a watertight seal between the grommet 76 and the electrical cord.

Figure 18:
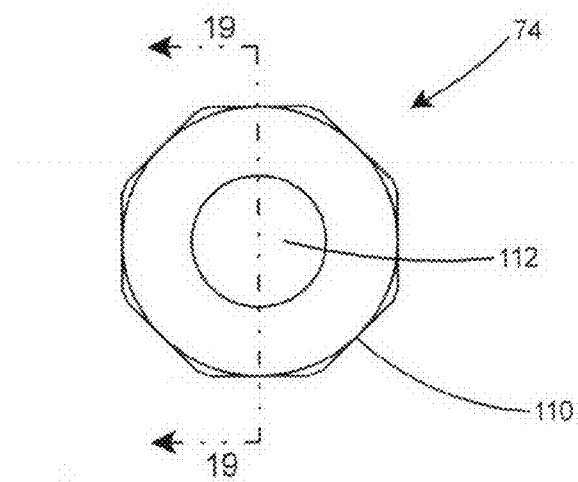
FIG. 18 is a plan view of a compression nut that forms a portion of the cord grip fitting depicted in FIG. 10.
Figure 19:
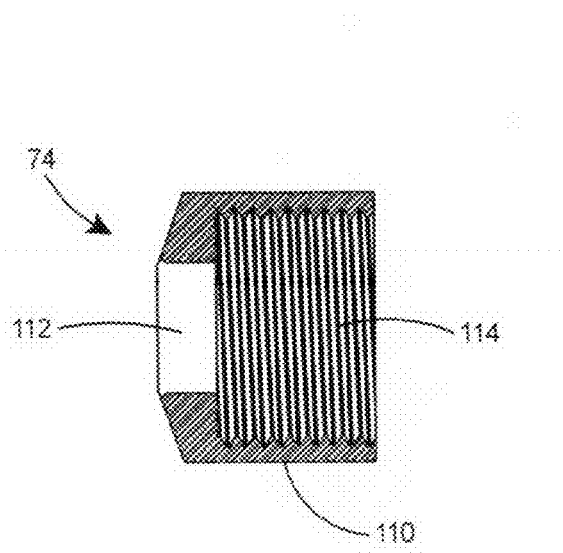
FIG. 19 is a sectional view of the compression nut taken along line 19-19 of FIG. 18.

Referring to FIGS. 18-19, the compression nut 74 includes a hex-shaped outer periphery 110, a central bore 112 therein to accommodate an inserted electrical cord, and internal screw threads 114. As shown in FIG. 10, internal screw threads 114 of compression nut 74 will engage the external screw threads 92 on the cord grip body 70 and continued tightening will tighten the fingers 108 of gripper ring 72 against the surface of the electrical cord thereby securing it with respect to the cord grip fitting 28.

Figure 22:
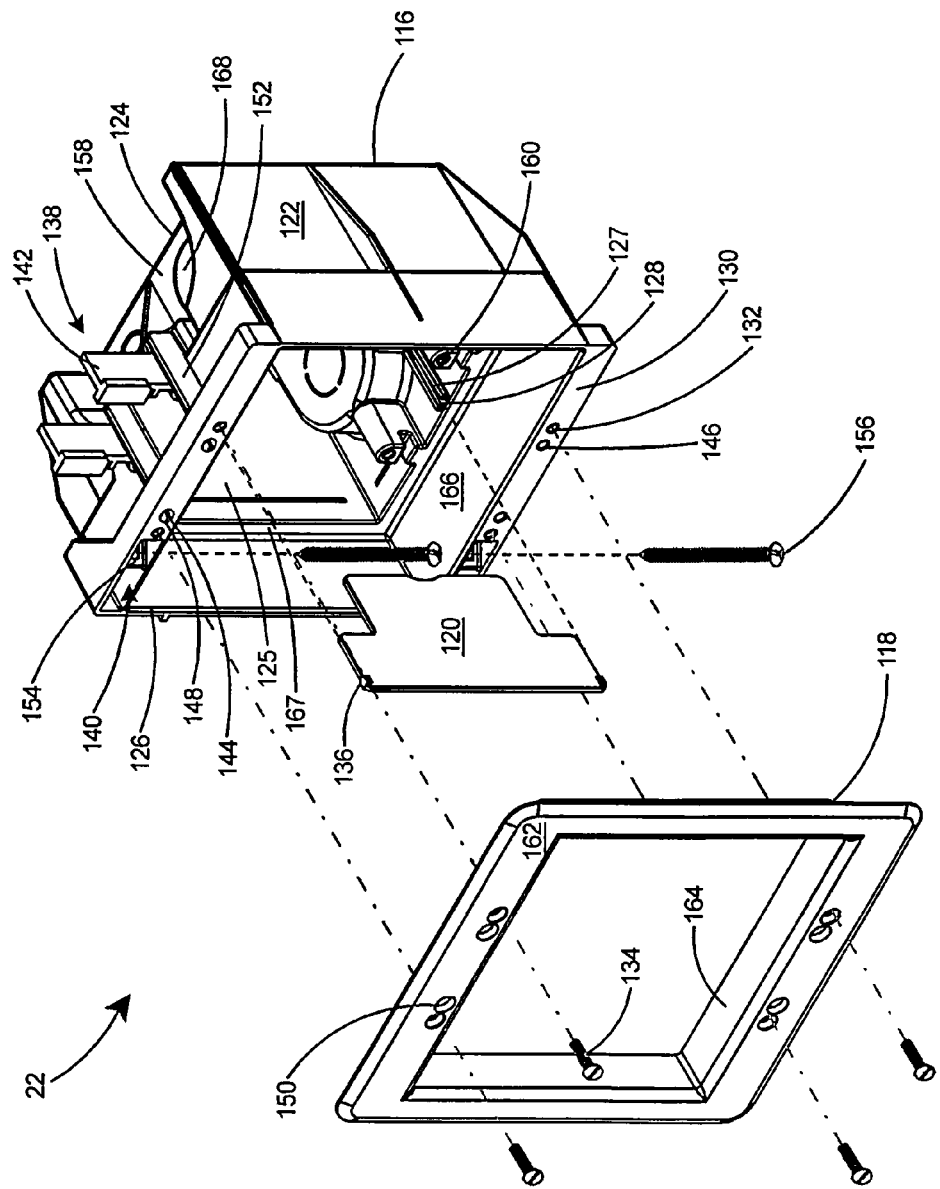
FIG. 22 is a perspective view of an electrical box that forms a portion of the electrical box assembly of FIG. 1.
Figure 23:
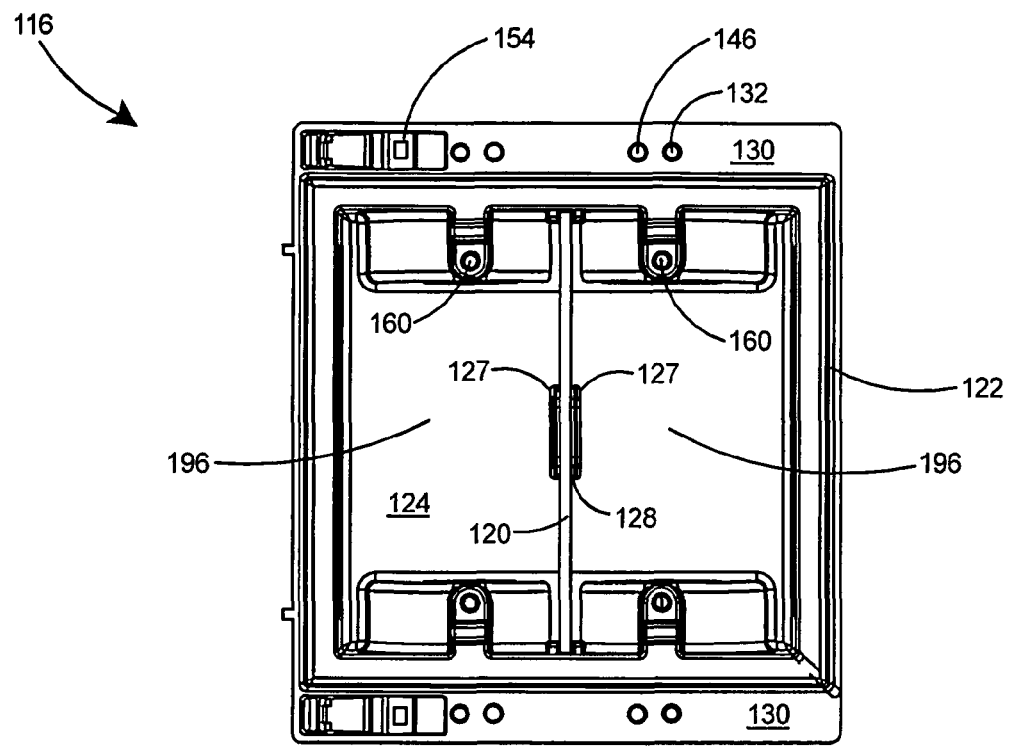
FIG. 23 is a front view of the electrical box of FIG. 22.

With reference to FIGS. 22-23, the electrical box 22 includes a box member 116 a trim plate 118 and an optional divider plate 120. The box member 116 includes side walls 122, and a back wall 124 defining an inner cavity 125. The electrical box 22 further includes a front edge 126, two rails 127 defining a channel 128 for receipt of the divider plate 120, and a flange 130 extending from the front edge 126 along the top and bottom of the box member 116. The flange 130 includes apertures 132 for receipt of fasteners 134 from the trim plate 118. Tabs 136 are provided on the trim plate 118 to enable the divider plate 120 to securely seat in the channel 128. The electrical box 22 includes two mounting arrangements 138, 140 for mounting the electrical box 22 to a wall. The first mounting arrangement 138 includes rotatable flags 142 secured to the ends of mounting fasteners 144 that pass through apertures 146 in the flange 130 of the box member 116. After the trim plate 118 is secured to the electrical box 22, the heads 148 of the mounting fasteners 144 are accessible through oversize apertures 150 in the trim plate 118, thus the mounting fasteners 144 will be accessible for tightening after the trim plate 118 is secured to the box member 116. Generally, four mounting fasteners 144 are provided around the periphery of the flange 130 portion of the box member 116 for the purpose of securing the electrical box 22 to a wall. The first mounting arrangement 138 including the rotatable flags 142 is typically used in old work installations for mounting the electrical box 22 to a wall by simply cutting a hole in the drywall and rotating the mounting fasteners 144 until the drywall is clamped between the flags 142 and the trim plate 118. The box member 116 includes sidewall flanges 152 for stopping rotation of flags 142 thereby causing the flags 142 to be pulled toward trim plate 150 as the mounting fasteners 144 are rotated clockwise. A second mounting arrangement 140 includes a boss 154 within each of the flanges 130 at one end of the box member 116 and mounting screws 156. The second mounting arrangement 140 is typically used in new work installations to mount the electrical box 22 to a stud (not shown). The box member 116 further includes recessed areas 158 in the side walls 122 and connection points 160 within the box member 116 to enable the connection of electrical components thereto. The divider plate 120 enables the mixing of high voltage and low voltage components within the inner cavity 125 of the electrical box 22. If either high voltage or low voltage components are used on both sides of the electrical box 22, there is no need to install the divider plate 120. If however, the installation requires that both a high voltage component and a low voltage component be installed within the inner cavity 125, the divider plate 120 must be installed by sliding it into the channel 128 until the tabs 136 lock it securely therein. Divided in this manner, the inner cavity 125 can support a low voltage component side by side with a high voltage component (not shown). Trim plate 118 includes a flange 162 and a rearward extending peripheral wall 164. It should be noted that box member 116 is preferably molded in one piece of plastic. Although divider plate 120 is shown herein as being a separate member, it is within the scope of the invention that divider plate 120 could also be integral with and molded in one piece with the box member 116.

Electrical box 22 is a recessed electrical box that will recess an electrical component (not shown) within the wall. Electrical box 22 includes a collar 166 that extends rearward from the front edge 126 of the box to a recessed wall portion 167. Knockout areas 168, provided in the recessed areas 158 of the sidewalls 122, can be removed to provide openings for feeding electrical cables into the inner cavity 125.

Figure 25:
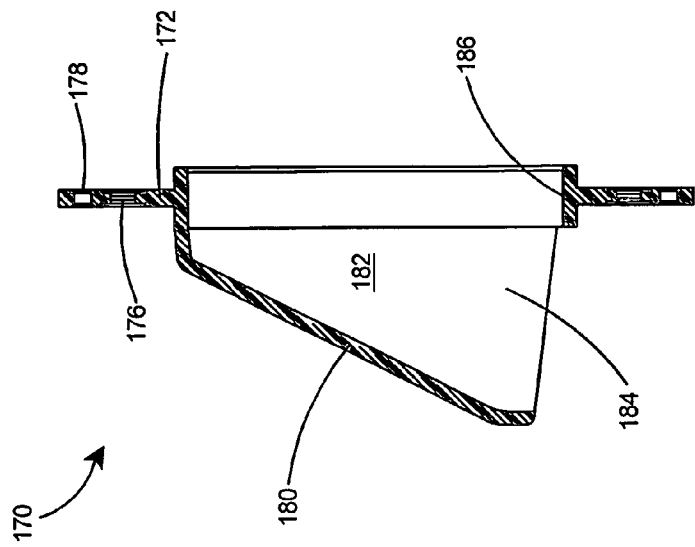
FIG. 25 is a sectional view of the low voltage scoop taken along line 25-25 of FIG. 24.
Figure 24:
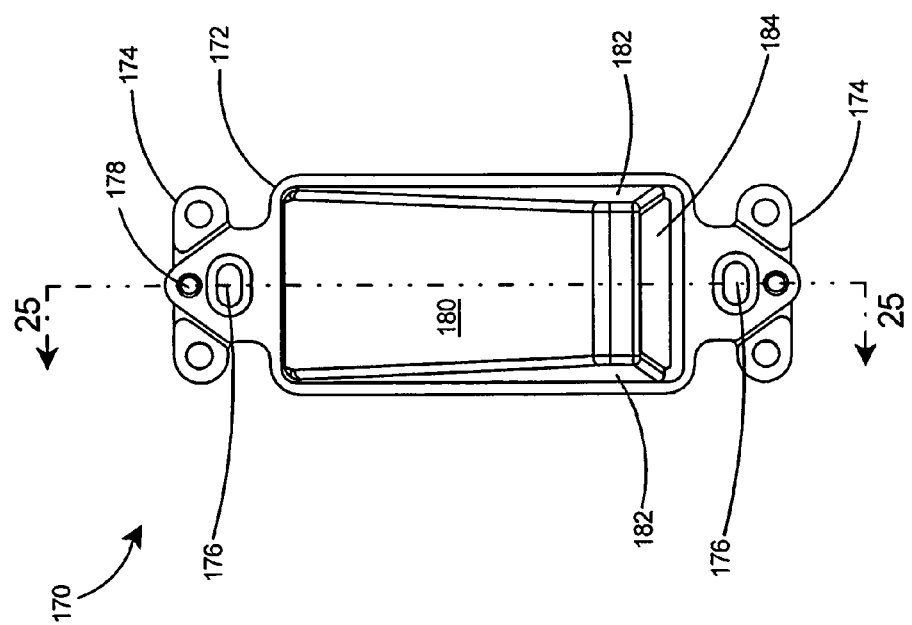
FIG. 24 is a front elevation view of a low voltage scoop that may optionally used to form a portion of the electrical box assembly of FIG. 1.

Referring to FIGS. 24-25, there is shown a low voltage scoop 170 which can optionally be used with the cable holding electrical box assembly of the present invention. The low voltage scoop 170 includes a base portion 172, two ears 174 extending outward from the base portion 172, an aperture 176, and a threaded bore 178 in each ear 174. The low voltage scoop 170 includes an outer wall 180 and sidewalls 182 that define an inner passageway or conduit 184 for the passage of low voltage cables there through. A perimeter wall 186 provides a wide surface for supporting cables thereon. Preferably the low voltage scoop 170 is molded in one-piece of plastic. The low voltage scoop 170 may be secured to the connection points 160 (see FIG. 1) of the cable holding electrical box assembly in order to provide a conduit for passage of a coaxial cable or similar low voltage cable there through to the second electrical box 30.

Figure 26:
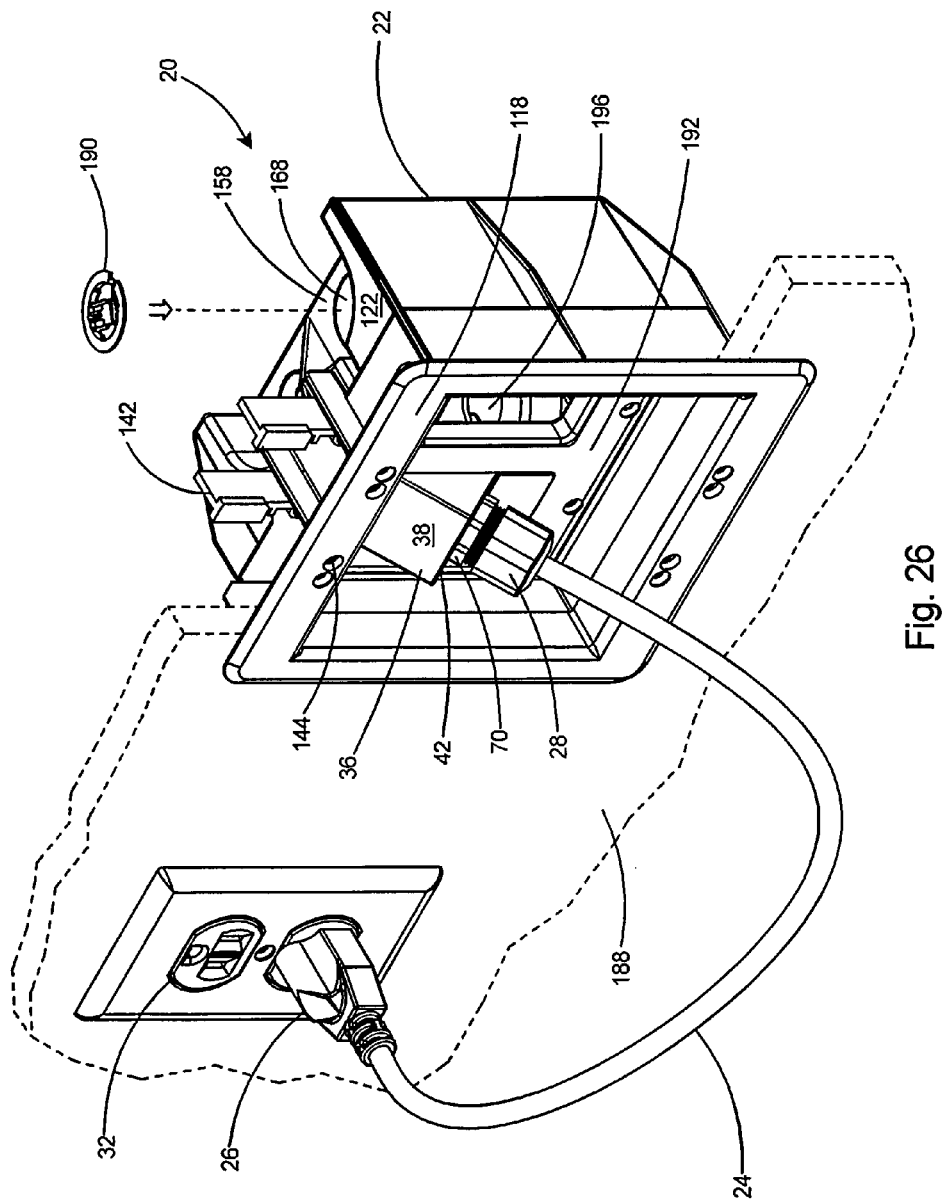
FIG. 26 is a perspective view of the preferred embodiment of the electrical box assembly including an electrical cord plugged into an existing electrical outlet.

FIG. 26 is a perspective view of the preferred embodiment of the electrical box assembly 20 of the present invention installed in a wall 188 that is partially cut away in the figure. The electrical box assembly 20 includes an electrical box 22 and an electrical cord 24. The electrical box 22 is secured to the wall using one of the mounting arrangements such as the rotatable flags 142 which are clamped against the wall 188 by rotating the mounting fasteners 144 until they are tight against the wall. The cord grip fitting 28 secures to the lower surface 42 of the nose portion 38 of the cord grip mount 36. A quick connect electrical fitting 190 is shown exploded away from one of the knockout areas 168 in the recessed area 158 of the side wall 122. The recessed areas 158 in the side walls 122 enables the use of electrical fittings or connectors such as the BLACK BUTTONB™ push-in connector 190 for connecting non-metallic cable to the multi-gang electrical box. The BLACK BUTTONB™ push-in connector, available from Arlington Industries of Scranton, Pa., is simply pushed into one of the knockout areas 168 provided in the recessed area 158. The recessed area 158 prevents the push-in connectors 190 from projecting outward from the sidewalls of the electrical box 22 and thus interfering with placement of the electrical box in locations where space is tightly restricted. A cover plate 192 is secured to the electrical box to seal around the electrical components installed within the box. As shown in FIG. 23, electrical box 22 includes two enclosures 196, including a first enclosure on the left side of the figure and a second enclosure on the right side of the figure. As shown in FIG. 26, one of the electrical enclosures 196 can be left open, without a low voltage scoop attached, and still function for the intended purpose of passing a low voltage cable there through enclosure 196 in order to feed low voltage signal to a second electrical box (not shown). As long as electrical box 22 is divided into separate electrical enclosures to separate high and low voltage enclosures, low voltage cable can be passed through the enclosure 196 and routed to a second electrical box.

Figure 27:
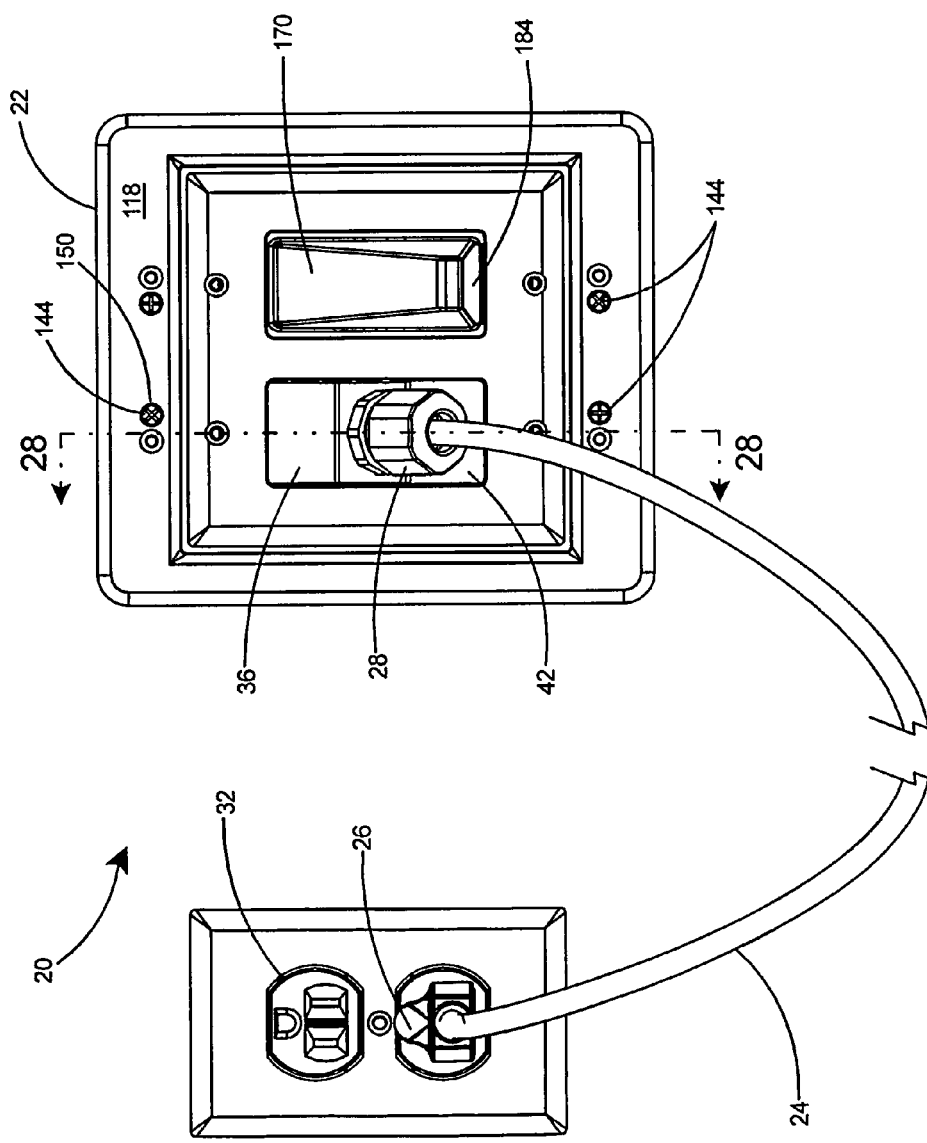
FIG. 27 is a front elevation view of the electrical box assembly depicted in FIG. 26.

With reference to FIG. 27 there is shown a completed installation of the cable holding electrical box assembly 20 installed on a wall. A cord grip fitting 28 and a low voltage scoop 170 are mounted side by side in the two-gang electrical box assembly. Electrical power is fed to the left hand side of the electrical box 22 by electrical cord 24, which is plugged into an existing electrical outlet 32. The low voltage scoop 170 provides a passageway 184 through which low voltage cable can be routed to supply a second electrical box (not shown).

Figure 28:
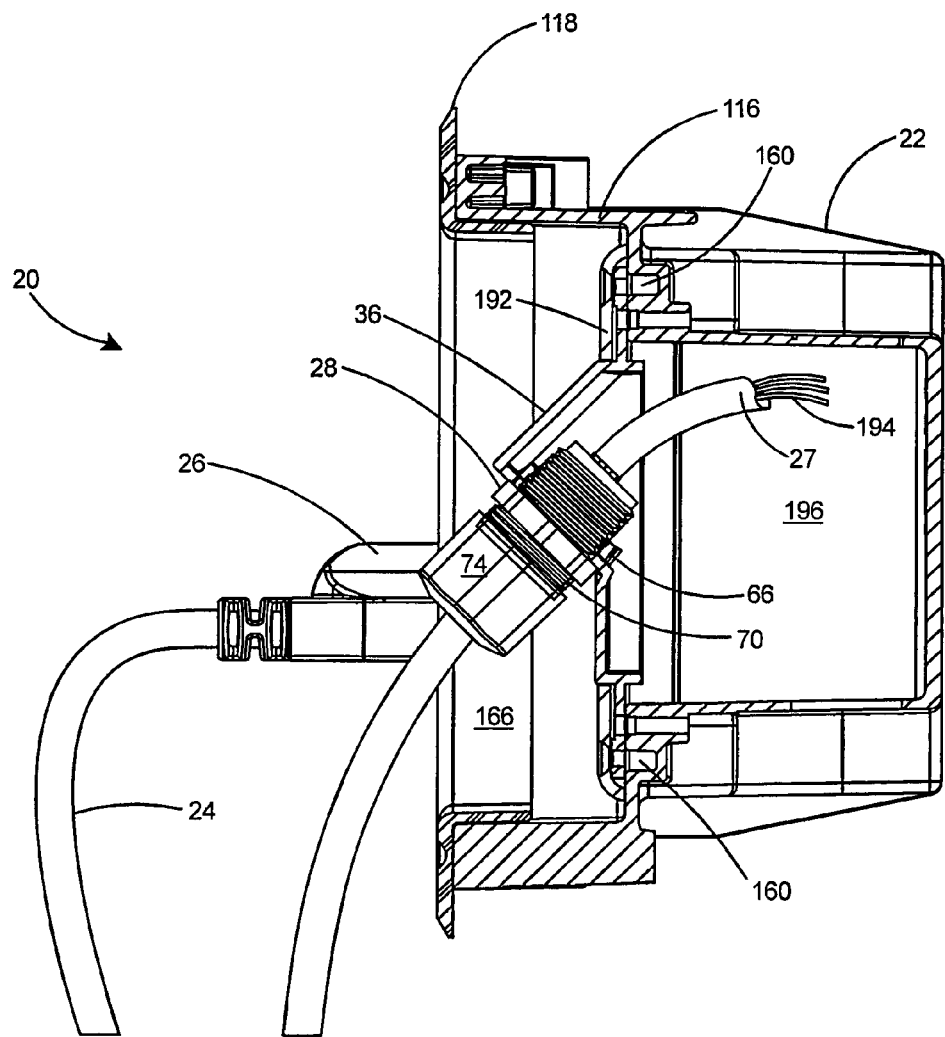
FIG. 28 is a sectional view of the electrical box assembly taken along line 28-28 of FIG. 27.

Referring to FIG. 28, the cord grip mount 36 is secured to the connection points 160 of the electrical box 22 and a cord grip fitting 28 is secured to the cord grip mount 36. Electrical cord 24 extends through the cord grip fitting 28 and is held securely therein. After electrical cord 24 is secured to the electrical box 22 by the cord grip fitting 28, the electrical conductors 194 within the electrical enclosure 196 can be connected to supply line voltage to a separate electrical box (not shown). Locknut 66 secures the cord grip fitting 28 to the cord grip mount 36 and compression nut 74 clamps the electrical cord 24 within the fitting.

Figure 29:
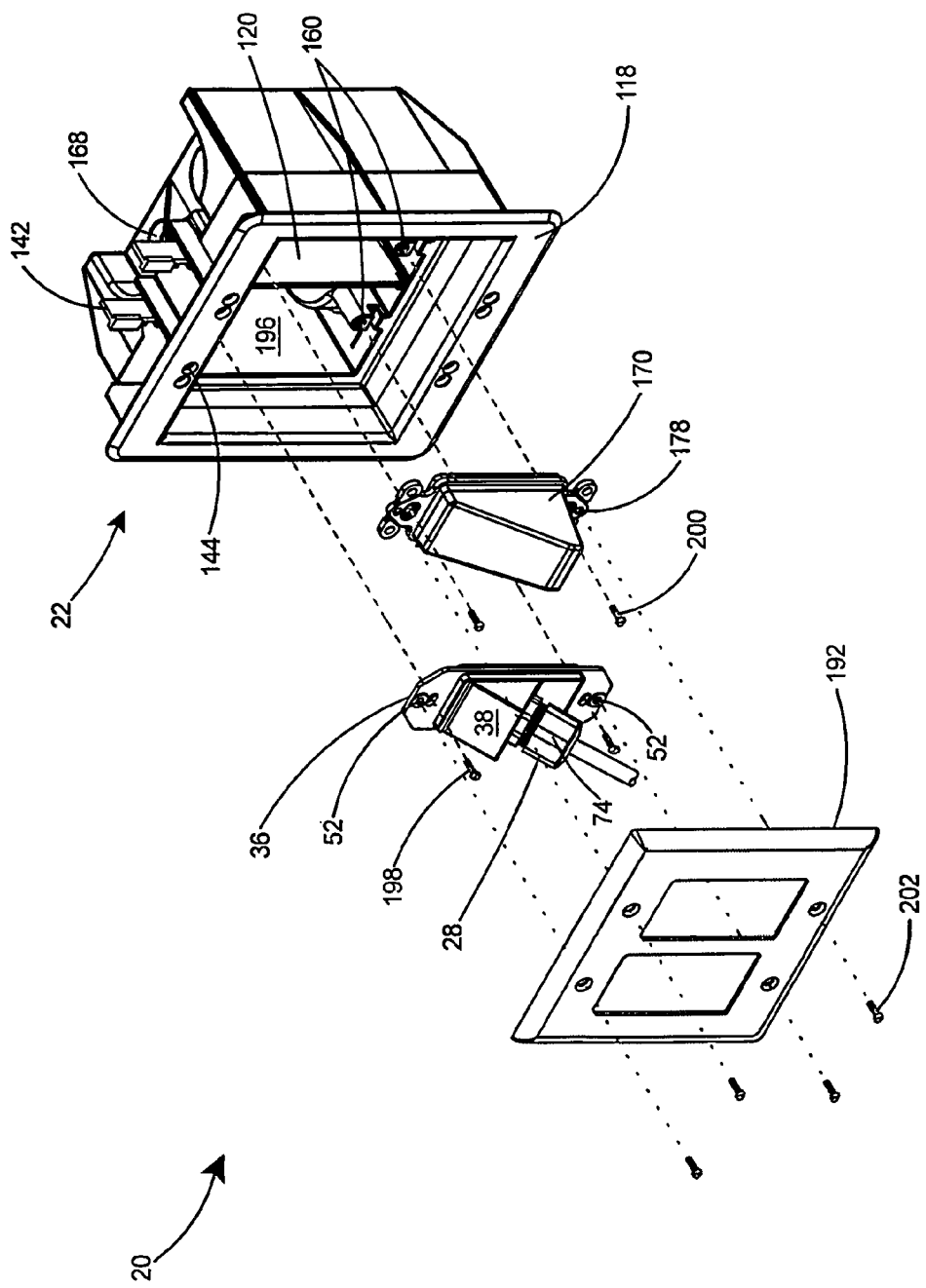
FIG. 29 is an exploded perspective view of a cord grip fitting and a low voltage scoop in alignment with the preferred embodiment of an electrical box assembly according to the present invention.

Reference is made to FIG. 1 for an understanding of the operation of the present invention. Prior to installing the electrical box assembly 20 on the wall, cables 204, 206 are pulled between the lower box assembly 20 and the upper box 30. The electrical box 22 is then secured to the wall using one of the two mounting arrangements as described hereinabove with reference to FIG. 22. With the electrical box 22 secured to the wall, two electrical components are secured to the box, which could be two high voltage components, two low voltage components or one of each depending on the application. Reference is made to FIG. 29, which depicts the installation of a high and a low voltage component. For installation of a high and low voltage component, the installer inserts divider plate 120 into the electrical box 22 to provide separate electrical enclosures for each component. The cord grip fitting 28 is secured to cord grip mount 36 and the free end of the electrical cord 24 is fed through the cord grip fitting 28. Wiring connections completed inside the electrical enclosure 196, and the cord grip mount 36 is then secured by fasteners 198 to the connection points 160 on the left side of the electrical box 22. Compression nut 74 of cord grip fitting 28 is then tightened to securely tighten the electrical cord within the fitting 28. Low voltage cable is then pulled from the box through low voltage scoop 170 and the scoop is secured by fasteners 200 to connection points 160 on the right hand side of the electrical box 22. Cover plate 192 is then secured with fasteners 202 to threaded bores 52 and 178 in cord grip mount 36 and low voltage scoop 170 respectively to complete the installation. Cover plate 192 includes openings therein to accommodate the nose portion 38 of the cord grip mount 36 and the nose portion 203 of the low voltage scoop 170.

As shown in FIG. 1, in order to supply electricity to a TV, the cable holding electrical assembly 20 is installed low on the wall. A second electrical box 30 is installed on the wall in the location at which the TV will be installed. NM electrical cable 204 supplies electricity from cable holding electrical assembly 20 to the outlets 34 in electrical box 30. Coax cable 206 is routed through the low voltage scoop 170 in box assembly 20 to provide video signal hookup at the upper electrical box 30. The cable holding electrical assembly 20 thereby provides a means of supplying line voltage and video signal to a TV without the need to tear up existing walls or to pull cables through studs 208.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical box assembly comprising:
   an electrical box including a mounting arrangement for securing said electrical box to a wall;
   a recessed wall portion on said electrical box;
   a plurality of electrical enclosures extending from said recessed wall portion, said electrical enclosures including sidewalls;
   connection points at each of said electrical enclosures, said connection points enabling connection of an electrical component at each of said enclosures;
   a cord grip fitting for mounting to said connection points at a first of said electrical enclosures;
   an electrical cord having a plug end and a free end, said free end secured to said electrical box by said cord grip fitting;
   said cord grip fitting including a cord grip body having a bore there through, a compression nut, a flexible gripper ring, a grommet, and a conical seat at the entry of said bore for engaging said flexible gripper ring thereby securely gripping said free end of said electrical cord within said bore of said cord grip body for supplying high voltage through said electrical cord to said first electrical enclosure; and
   a knockout area in said sidewalls of said electrical enclosure, said knockout enabling feeding of electrical supply from said electrical box assembly to a second electrical box.

2. The electrical box assembly of claim 1 wherein said cord grip fitting includes
   a cord grip mount secured to said connection points;
   an opening in said cord grip mount; and
   said cord grip fitting secured in said opening.

3. The electrical box assembly of claim 2 wherein said cord grip fitting includes
   a tubular cord grip body having a first end, a second end, and a central flange;
   a mount fastening arrangement for securing said cord grip fitting to said cord grip mount; and
   a cord fastening arrangement for securing an electrical cord to said cord grip fitting.

4. The electrical box assembly of claim 3 wherein said mount fastening arrangement for securing said cord grip fitting to said cord grip mount includes
   external threads on said first end of said cord grip body;
   a sealing ring; and
   an internally threaded locknut for urging said sealing ring against said central flange of said cord grip body.

5. The electrical box assembly of claim 3 wherein said cord fastening arrangement includes
   external screw threads and a conical seat coaxial with said internal bore on said second end of said cord grip body;
   a one-piece gripper ring of resilient material having a circular periphery, a first end, a second end, an internal bore, and a plurality of fingers extending from said periphery of said first end; and
   a compression nut having internal screw threads therein for mating with said external screw threads on said second end of said cord grip body and urging said fingers of said gripper ring against said electrical cord.

6. The electrical box assembly of claim 1 wherein said mounting arrangement for securing said electrical box to a wall includes
   a front edge on said electrical box;
   a flange extending from said front edge of said electrical box;
   oversize openings in said flange;
   a mounting fastener extending through each of said oversize openings in said flange;
   a flag secured to each of said mounting fasteners; and
   a sidewall flange extending outward from said electrical box adjacent each of said mounting fasteners, said sidewall flange stopping rotation of said flag as said mounting fastener is rotated clockwise thereby drawing said flag toward said flange of said electrical box.

7. The electrical box assembly of claim 1 wherein said mounting arrangement for securing said electrical box to a wall includes
   a front edge on said electrical box;
   one or more flanges extending from said front edge of said electrical box;
   a boss within said flange; and
   mounting screws for engaging said boss, said mounting screws capable of being driven into a stud on said wall.

8. The electrical box assembly of claim 1 including
   a low voltage scoop secured to said connection points at a second of said enclosures; and
   said low voltage scoop providing a conduit for passage of a low voltage cable there through to said second electrical box.

9. The electrical box assembly of claim 1 wherein said connection points include bosses with bores therein for acceptance of fasteners.

10. The electrical box assembly of claim 1 wherein
    said sidewalls of said electrical enclosure include recessed areas therein; and
    said knockout areas are in said recessed areas.

11. The electrical box assembly of claim 1 including a quick connect electrical fitting in said knockout area.

12. The electrical box assembly of claim 2 wherein
    said cord grip mount includes an outward extending nose portion;
    said nose portion includes an upper surface and a lower surface; and
    said cord grip fitting secures to said lower surface.

13. The electrical box assembly of claim 12 wherein
    said electrical box includes a cover plate with one or more openings therein; and
    said nose portion of said cord grip mount extends through one of said openings of said cover plate.

14. The electrical box assembly of claim 13 wherein
    said cord grip mount includes inner apertures; and said inner apertures are for receipt of fasteners for securing said cord grip mount to said connection points.

* * * * *